(No Model.) 5 Sheets—Sheet 1.

J. F. STEWARD.
CORN HARVESTER.

No. 498,320. Patented May 30, 1893.

Witnesses.
Arthur Johnson.
W. L. Miles

Inventor:
John F. Steward (No Model.) J. F. STEWARD. 5 Sheets—Sheet 3.
CORN HARVESTER.

No. 498,320. Patented May 30, 1893.

Witnesses:
Arthur Johnson
W. L. Miles

Inventor:
John F. Steward (No Model.) 5 Sheets—Sheet 4.

J. F. STEWARD.
CORN HARVESTER.

No. 498,320. Patented May 30, 1893.

Witnesses.
Arthur Johnson.
W. L. Miles

Inventor
John F. Steward (No Model.) 5 Sheets—Sheet 5.

J. F. STEWARD.
CORN HARVESTER.

No. 498,320. Patented May 30, 1893.

Witnesses.
Arthur Johnson.
W. L. Miles

Inventor.
John F. Steward

United States Patent Office.

JOHN F. STEWARD, OF CHICAGO, ILLINOIS.

CORN-HARVESTER.

SPECIFICATION forming part of Letters Patent No. 498,320, dated May 30, 1893.

Application filed May 19, 1888. Serial No. 274,414. (No model.)

*To all whom it may concern:*

Be it known that I, JOHN F. STEWARD, of Chicago, in the county of Cook and State of Illinois, have invented certain new and useful Improvements in Corn Harvesting and Stripping Machines, of which the following is a full description.

My invention has reference to that class of corn harvesters adapted to be drawn through a field and cut the standing stalks which fall upon an elevating mechanism forming a part of the machine.

My invention consists in the construction hereinafter described and claimed, designed to render the machine strong and durable as a whole and the operation of its parts perfect and effective.

In the accompanying drawings.

In the first six figures I have represented the machine with the stripping mechanism removed, in which condition it delivers the cut stalks with the ears attached to the receptacle provided for them. In the remaining figures the machine is represented as provided with the stripping mechanism by which the ears are detached from the stalks.

Referring to the drawings: A rectangular frame consisting of the side bars B, B' and the end bars $B^2$ and $B^3$ is provided on its under side with brackets H, H', attached to the bars B, B' respectively. This frame is sustained in an inclined position on a transverse shaft $B^6$, which latter is provided on its two ends with the ground wheels $B^9$ and $B^{10}$. The shaft $B^6$ is journaled in the lower ends of the brackets H, H' so that the frame which is supported on these brackets may be rocked in order to vary the height of the cut as more fully described hereinafter. The two side bars B, B' extend some distance beyond the lower end bar $B^3$ where they are connected by the transverse bar $B^4$, which extends from the bar B' a slight distance beyond the bar B. The frame is further strengthened by a diagonal brace $B^5$, connected at one end to the ground wheel axle $B^6$, and extended therefrom across and beyond the bar $B^4$ at the left side of the frame. A bar $B^7$ connected to the ends of the bars $B^4$ and $B^5$ extends forward some distance parallel with the side bar B, and supports a divider L. The ends of the bars $B^4$, $B^5$, and $B^7$ where they meet are united by a triangular plate $B^8$ bolted or otherwise firmly secured thereto.

The rectangular frame is provided with a series of boards $a^2$, forming a flooring. These boards are attached at their upper ends to the upper edge of the bar $B^2$, and at their lower ends are secured upon a rail $a^3$ underlying the bar $B^3$, and connected thereto by the inclined transverse board $a^4$.

C, C' and $C^2$, are guide boards supported on edge, at intervals upon the flooring $a^2$, and extending lengthwise of the frame. These boards serve as guides, upon which the stalks lying transversely thereon and the ears depending between the guides, are conveyed by an elevating mechanism presently to be described.

E, E' and $E^2$ are a second series of guide boards supported on edge over the guides C' C', and $C^2$ a sufficient distance above them to permit the cut stalks to pass between the two sets of guides. They extend lengthwise of the frame and are sustained at their upper ends by the transverse bar $B^{11}$, passing through them and overlying the bar $B^2$ from which it is supported by the standards $B^{12}$ and $B^{13}$. At their lower ends the guides are mounted on a rock shaft F which is sustained at one end by a standard $B^{14}$, extending from the bar $B^3$, and at its other end by the guide E which is in turn sustained by the bracket $F'$, shown in Fig. 1, which is secured to the guide E in which the shaft is mounted and which extends therefrom outward and then downward and finally inward to the side bar B to which it is attached. It will thus be seen that this bracket prevents the upper guides and the shaft F, on which they are mounted from bending or sagging. By extending this bracket outward beyond the side bar B and guide E space is left for the passage of the butts of the stalks.

$G^8$, $G^9$ and $G^{10}$ represent endless toothed elevating chains passing around sprocket wheels $G^5$, $G^6$ and $G^7$ mounted loosely on the shaft F, at the lower end of the machine and around sprocket wheels $G^2$, $G^3$ and $G^4$ keyed to a shaft G at the upper end of the machine. This shaft extends through the ends of the upper guides and revolves at one end in a bearing $g$ on the guide $E^2$, and at its other end in a bearing $G'$, on the standard $B^{13}$. It is provided with a sprocket wheel $H^8$ located between the guide E and bearing $G'$—and through which it receives a rotary motion. These elevating chains are so arranged, that as they travel, the teeth thereon will engage the stalks lying transversely between the upper and lower guides, and convey them upward. A belt tightener of any suitable form may be employed in connection with these elevating chains, but I recommend the construction shown at K—Fig. 2, in which an arm $k^{10}$, is loosely mounted on the shaft F and is provided on its end with a roller $k^{11}$, arranged to bear upon the chain as it passes thereunder. The two upper bars $B^2$ and $B^{11}$, the lower end bar $B^3$ and its overlying shaft F, which gives support to the upper guides, are extended some distance beyond the side of the frame, to permit the passage of the heads of stalks of unusual length, between them. The upper ends of the lower guides are rounded off, as at $p$—Fig. 2, in order that the stalks, conveyed by the elevating chains, may pass readily therefrom.

J, represents a forwardly and downwardly extending chute attached to the flooring $a^2$, at the upper end of the elevating mechanism and serving to direct the stalks outward after they have left the elevating chains.

I I I are deflecting rods attached to the upper guides and extending therefrom forward and slightly downward, to assist in guiding the stalks into the receptacle.

Figures 2, 6:
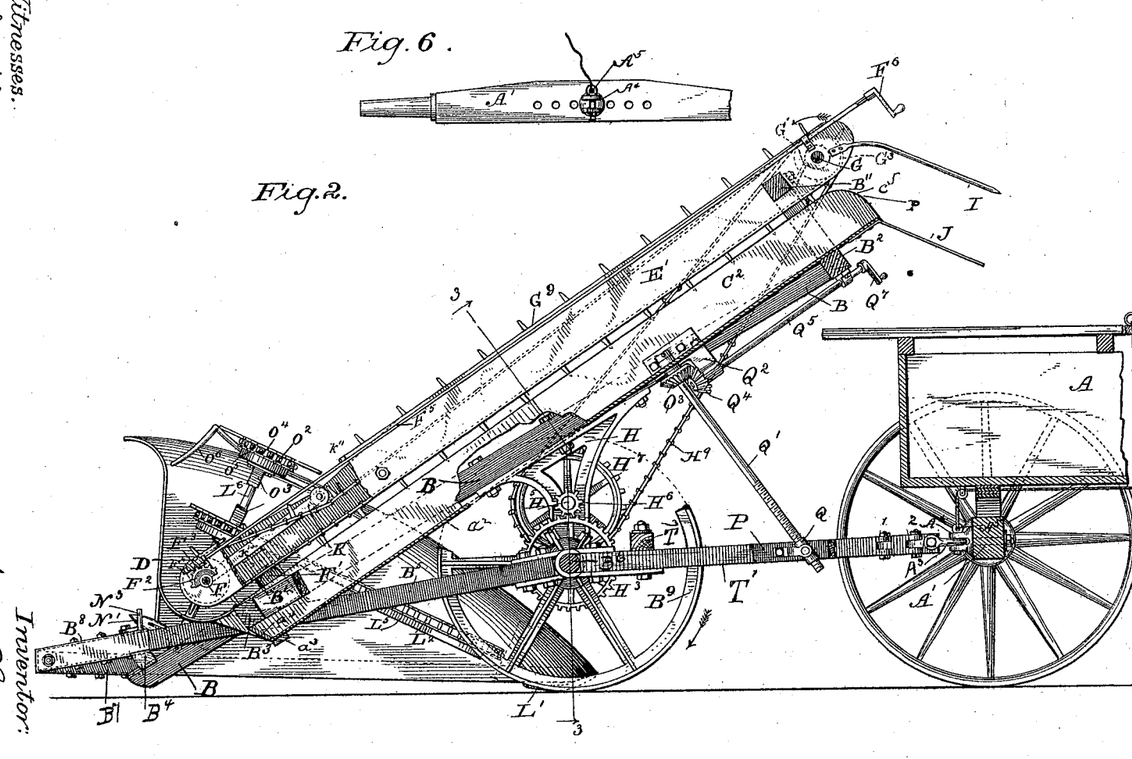
Fig. 2. is a longitudinal vertical section of the same on the line 2—2 of the preceding figure.
Fig. 6 is a side elevation of the axle of the receptacle for the cut stalks showing the manner by which it is adjustably connected to the harvesting machine.
Figure 3:
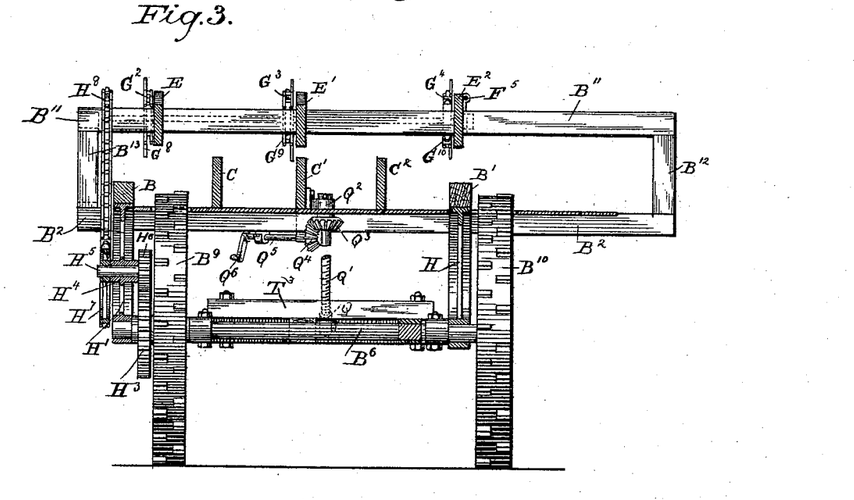
Fig. 3. is a vertical cross section on the line 3—3 of Fig. 2—as viewed from the rear.

D represents a trough or hopper for receiving the cut stalks before they are elevated. This receptacle is located across the lower end of the frame at right angles to the line of travel, and is constructed to receive the fallen stalks and present them to the elevating chains. It is attached to the upper edges of the lower guides from which it extends in a curved direction rearward and then upward a short distance as shown in Fig. 2.

The divider L before alluded to is located at the side of the frame and extends forward in the direction of the line of travel. It is supported as before stated upon the bar $B^7$, and is provided on its end with the shoe $L''$ adapted to ride upon the ground as the machine advances.

Figures 4, 5:
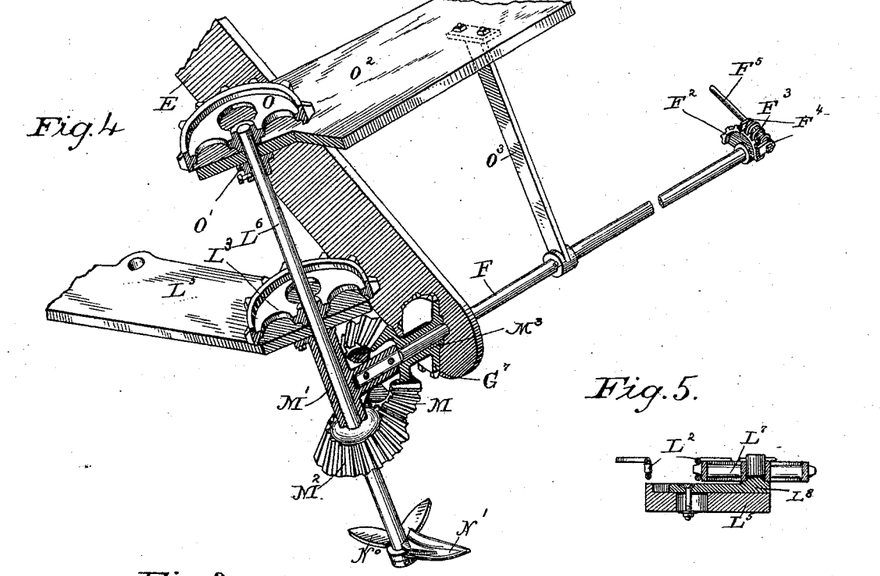
Fig. 4. is a perspective view partly in section of the cutter and adjacent parts.
Fig. 5 is a cross section of the gathering chain and its tightening pulley on the line $z$—$z$ of Fig. 1.

N is a rotary cutter located between the divider and side of the frame. It consists of a star wheel $N^o$ and a guard finger $N'$, through which it revolves, the former keyed to the lower end of a forwardly inclined shaft $L^6$, and the latter mounted loosely thereon below it, being prevented from turning by the pin $N^3$ projecting from the upper face of the plate $B^8$. The shaft $L^6$ revolves in a bearing $M'$ rigidly attached to the end of the shaft F as shown in Fig. 4. The cutter receives a rotary motion through a bevel pinion $M^2$ keyed to the shaft $L^6$ below the bearing $M'$, said pinion arranged to be driven by a pinion M, mounted loosely on the shaft F, and formed in one piece with the sprocket wheel $G^7$.

$L^5$ represents a board or support encircling the shaft $L^6$ and bolted to the bearing $M'$. It extends downward and forward between the divider and side of the frame and terminates a short distance in rear of the end of the divider, where it is provided with a journal on which is mounted a sprocket wheel $L^4$.

Keyed to the shaft $L^6$ immediately above the board $L^5$ is another sprocket wheel $L^3$, around which and the sprocket wheel $L^4$ a toothed gathering chain $L^2$ is passed. The teeth of this chain are constructed to span the space between it and the side of the divider in order that the stalks may be drawn rearward by the said chain and presented to the cutter. By inclining the end of the gathering chain downward as shown, it is adapted more readily to engage stalks which may be in an inclined position.

Figure 1:
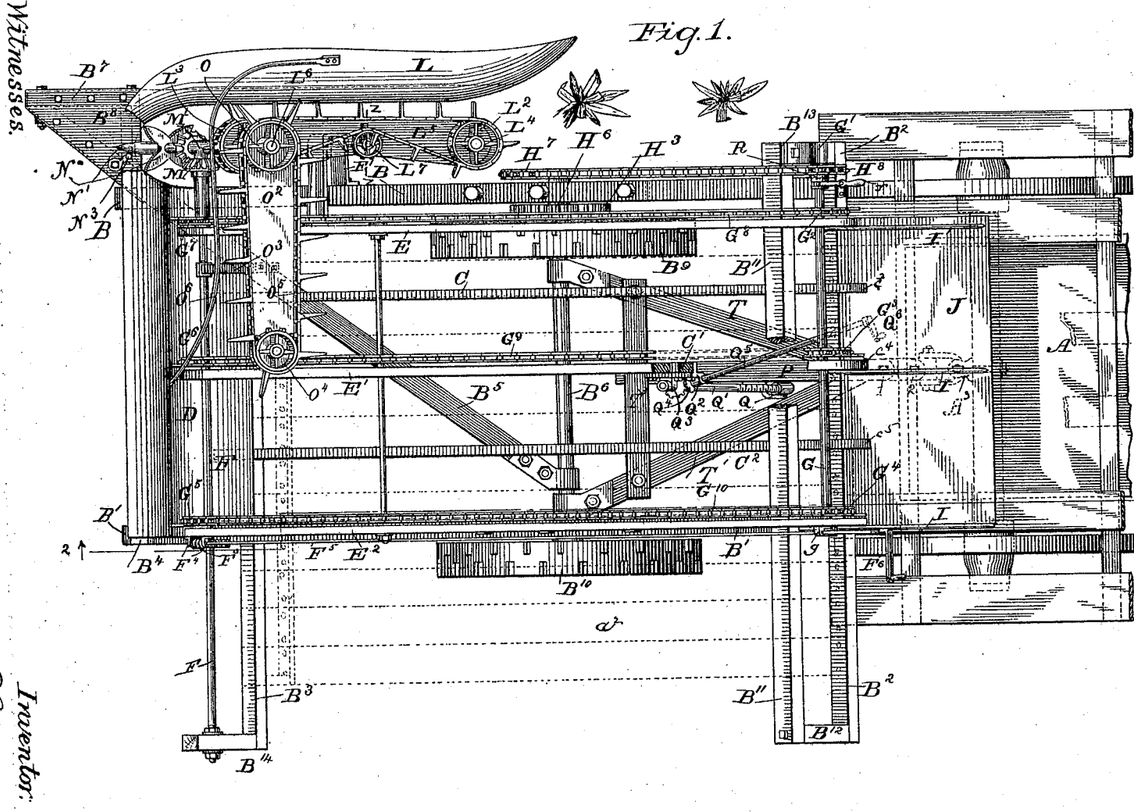
Figure 1 is a top plan view of a corn harvesting machine, and its attendant receptacle constructed in accordance with my invention.

To provide for taking up the slack in the gathering chain, and to afford room for the butts of the cut stalks to pass upward without encountering the chain, I secure to the board $L^5$ about midway of its length where it crosses the elevating mechanism, a plate $L^8$, shown in Figs. 1 and 5, provided with a journal, and mount loosely thereon a sprocket wheel $L^7$, which is arranged to engage the chain $L^2$. The plate is secured to the board by a bolt extending through a slot, this arrangement admitting of the adjustment of the plate.

In order that the stalks after they are cut may be properly guided and deflected into the hopper at the lower end of the machine, I provide the toothed gathering chain $O^5$ which is extended around sprocket wheels O and $O^4$ in a direction at right angles to the length of the machine. The wheel O is keyed to the upper end of the shaft $L^6$, and the wheel $O^4$ is mounted loosely on a journal, projecting upward from the end of a board $O^2$, which latter is supported on the shaft $L^6$ on a collar $O'$ beneath the sprocket wheel O and extends laterally therefrom parallel with the side of the hopper D to about midway of the same. This board is sustained by a brace $O^3$, rigidly secured to the shaft F and extending upward therefrom. It will thus be seen that the deflecting chain and the gathering chain and their supporting boards are sustained by and movable with the rock shaft F. This deflecting chain is designed to co-operate with a deflecting rod $O^6$, which is secured to the upper edge of the divider, from which point it extends in a curved direction to the rear, and then laterally across the path of the incoming stalks forward of the cutter substantially parallel with the deflecting chain. As a result of this construction the upper ends of the stalks encounter the deflecting rod and are engaged by the teeth of the deflecting chain before they are cut, and when cut their upper ends have already been inclined transversely of the frame and to the line of travel, so that they fall by gravity, aided by the deflecting chain into the hopper.

It is sometimes desirable, as the nature of the work may require, to vary the point at which the gathering chain engages the standing stalks, and inasmuch as this chain and its supporting board are sustained by and movable with the rock shaft F, it will be perceived that by rocking this shaft the end of the chain will be raised or lowered as the case may be. In order to effect this rocking motion of the shaft, it is provided on its end with a segment $F^2$ adapted to be engaged by a worm $F^3$ on the end of a shaft $F^5$ mounted in bearings on the frame. This shaft extends lengthwise of the frame along the upper edge of the guide board $E'$, in reach of the attendant where it is provided with an operating crank $F^6$. By turning the crank, the shaft F is rocked, which, through the bearing $M'$ and board $L^5$ rigidly attached thereto, changes the inclination of the gathering chain. The cutter is so arranged with relation to the gathering chain, and cutter guard that after the stalks have been engaged by said cutter they will be carried thereby to the left a slight distance, before they are severed, which action greatly aids the deflecting mechanism in properly guiding them into the hopper.

As a further means for aiding the deflecting mechanism in its action on the stalks, I preferably construct and arrange the gathering mechanism and its driving pinions so that the chain will travel to the rear somewhat faster than the advance of the machine, the result being that the standing stalks are inclined to the rear at their tops, and are readily engaged by the deflecting mechanism before they are severed.

Motion is imparted to the operating mechanism of the machine from the axle $B^6$, in the following manner: The bracket H is formed with a bearing $H^4$ in which is journaled the shaft $H^5$, which latter is provided on one end with a sprocket wheel $H^7$, and on its other end with a pinion $H^6$. The pinion $H^6$ is driven by a pinion $H^3$ keyed to the axle $B^6$. From the sprocket wheel $H^7$ a drive chain $H^9$ extends to the sprocket wheel $H^8$ on the end of the upper shaft G. Thus it will be seen that motion is imparted from the axle $B^6$, through the intermediate parts to the elevating chains, the gathering mechanism, the cutter and the deflecting mechanism.

The machine is provided with a draft tongue P connected to the axle $B^6$ by hounds of the usual form, consisting of the two beams T, $T'$ and the cross tie $T^3$ as plainly shown in Fig. 1. This tongue is constructed to be connected to the axle of a wheeled receptacle A in the following manner: the forward end of the tongue is provided with a clevis $A^3$ adapted to enter the perforated head of a forked bolt $A^4$ attached to the axle of the receptacle, the two being connected by a removable pin $A^5$. This pin is provided with a rope or chain which extends over suitable guides to a point within reach of the attendant, by which he is enabled to disconnect the receptacle from the machine without dismounting.

In order to facilitate the coupling of the receptacle A to the machine, I form the forward end of the tongue of sections and connect them by vertical pivots 1, 2; this construction permitting the clevis to be swung laterally and inserted in the forked head, without the necessity of changing the position of the machine or wheeled receptacle.

In order that the height of the cut may be varied, I have provided means for rocking the frame on the axle $B^6$ and thus raise or lower the lower end of the same, where the cutter is located. This is accomplished as follows: $Q'$ represents a shaft, screwed at its lower end through a tubular nut Q pivotally connected to the tongue P. At its upper end the shaft is journaled in a bearing $Q^2$, attached to the under side of the frame. This shaft is provided beneath this bearing with a bevel pinion $Q^3$ keyed thereto and arranged to be driven by a bevel pinion $Q^4$ keyed to a shaft $Q^5$, which latter revolves at one end in a depending arm of the bearing $Q^2$, and is extended therefrom upward through a bearing on the end bar $B^2$ where it is provided with a crank $Q^7$. By revolving this crank in the proper direction, the shaft $Q'$ is caused to be screwed down through the nut Q, thus raising the lower end of the machine and correspondingly increasing the height of the cut.

It is to be understood that I do not confine myself to the exact mechanism herein shown for varying the inclination of the gathering chain or for rocking the frame on the axle as devices the known equivalents of those shown may be employed without departing from the spirit of the invention.

In Fig. 6 I have shown the axle of the wheeled receptacle provided with a number of holes for the bolt $A^4$, by which construction the relative positions of the receptacle and machine can be adjusted laterally. This is desirable for the reason that some rows of corn are more widely separated than others, and as it is desirable to have the team straddle a stubble row while the machine is operating upon a standing row, it is in this way adapted to the necessities of the case.

The mechanism may be thrown out of action by a sliding clutch R of the well known form which as shown in Fig. 1, is mounted on the end of the shaft G—and is provided with an operating lever $r$.

The operation of the machine is as follows: A team being attached to the wheeled receptacle the machine is drawn through the field. The standing stalks are first acted on by the gathering chain and are drawn rearward toward the cutter. Before reaching the cutter however their upper ends are engaged by the deflecting chain and encounter the deflecting rod, by which they are inclined laterally and advanced some distance. In the meanwhile the stalks have reached the cutter by which they are severed, and owing to their inclination they fall into the hopper at right angles to the line of advance. They are then engaged by the elevating chains and are carried upward between the upper and lower guides, and delivered by said chains upon the chute J, from which they fall into the receptacle A.

From the foregoing description it will be seen that the stalks are delivered with the ears attached into the wheeled receptacle.

I will now proceed to describe the stripping attachment by which the ears are detached from the stalks and delivered separately into the receptacle.

Figure 7:
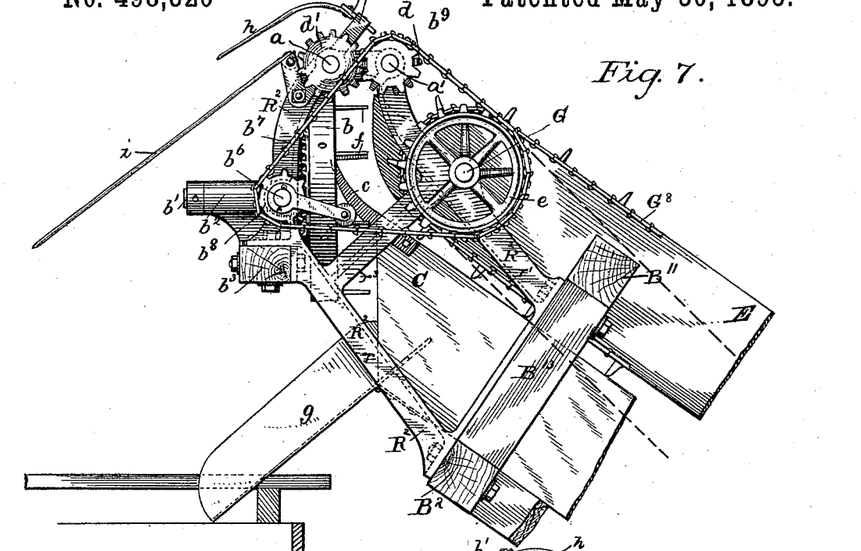
Fig. 7 is a side elevation of the upper portion of the harvester with my stripping mechanism applied thereto.

Referring to Figs. 7, 8, 9, 10 and 11 of the drawings: The stripping mechanism, the principal parts of which are mounted and sustained in frames R' and R$^2$, is applied to the upper end of the elevating mechanism by bolting or otherwise securing these frames to the standards B$^{12}$, B$^{13}$ and the end bar B$^2$. As shown in Fig. 7, each of these frames consists of two upwardly and forwardly extending arms $r$, $r'$ which approach at their ends and are connected by the horizontal portion which forms bearings for the stripping rollers $a$ $a'$. The frames are strengthened by the brace $r^3$ connecting the two arms midway of their length. The stripping rollers $a$, $a'$ are fluted longitudinally and are located above and across the delivery end of the elevating mechanism, side by side and on the same level. They are journaled in bearings in the upper ends of the frames R' R$^2$, and are provided on their ends with the co-operating pinions $d$, $d'$. The roller $a'$ is further provided on its end with a sprocket wheel $b^9$ from which it receives a rotary motion as more fully described hereinafter.

Figure 11:
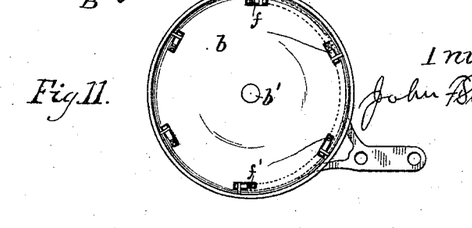
Fig. 11 is an inside face view of the wheel for feeding the ascending stalks to the stripping rollers.

In order that the ascending stalks may be presented sidewise to the rollers so that the ears may be detached with certainty, I provide a vertically revolving feeding wheel $b$ of peculiar construction. This wheel is mounted in a bearing $b^2$ attached to a bar $b^3$ extending transversely of the machine below the stripping rollers and between the two frames to which it is attached at its ends. It revolves in a vertical plane parallel to the axis of the rolls, and is provided near its periphery with a series of teeth $f$, connected thereto by radial pivots $f'$, in order that they may lie flatly against the face of the wheel while descending, or project therefrom in an operative position while ascending. In order that the teeth may assume the said positions at the proper time, I provide the curved track $k$, which is attached to two arms $k^2$ and $k^3$ projecting from a plate $k'$ secured to the side of the bar $b^3$. This track extends in close proximity to the outer peripheral face of the wheel in the path of the butts of the pivoted teeth—its upper end terminating at a point immediately above the axis of the wheel, and its lower end terminating somewhat past a point immediately below said axis. Thus it will be seen that the butts of the teeth on the ascending side of the wheel will successively encounter the track and the teeth will be sustained in an operative position, thereby carrying the stalks upward to the detaching rolls. When the teeth have reached a point above the axis of the wheel where the track terminates they will begin to descend and will fall by gravity and lie flatly against the face of the wheel out of the path of the ascending stalks. This wheel is provided on its outer face with the gear teeth $b^4$, which engage a bevel pinion $b^5$ keyed to a shaft $b^6$; which latter revolves at one end in the bearing $b^2$, and at its other end in a bearing formed in the frame R$^2$. It is provided on its end with a sprocket wheel $b^8$ arranged in the same plane with the wheel $b^9$.

Figure 8:
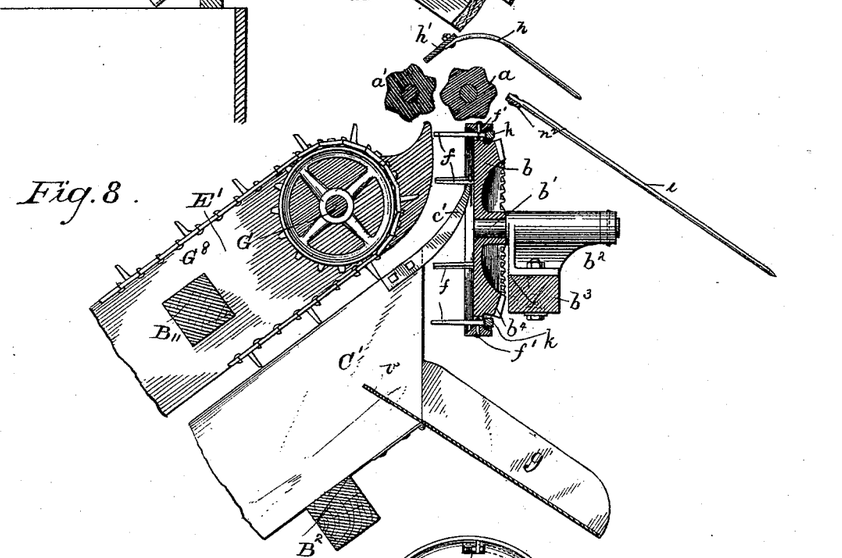
Fig. 8 is a longitudinal vertical section of the same on the line 4—4 of Fig. 9.
Figure 9:
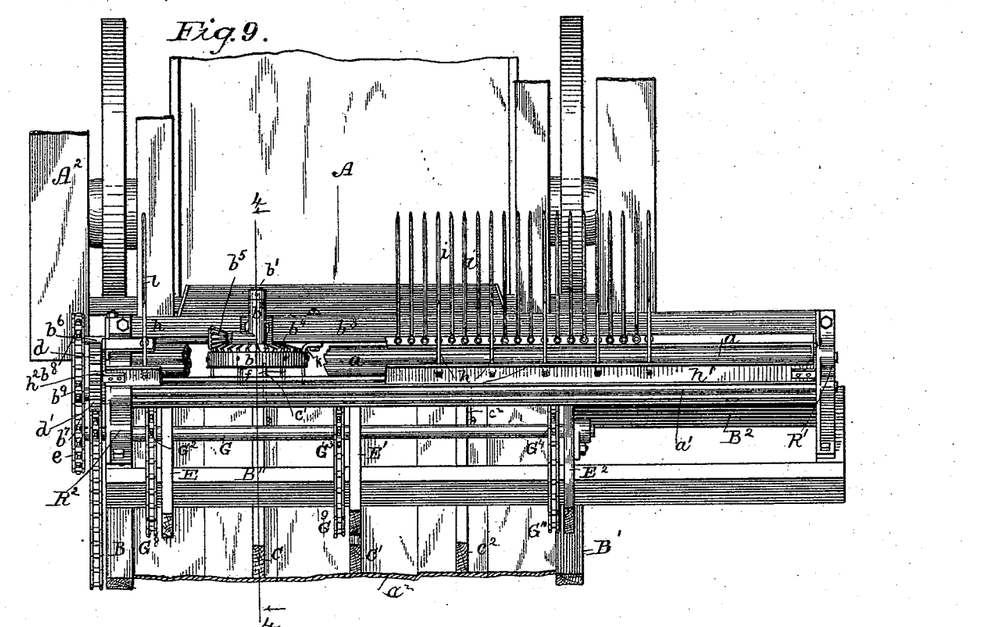
Fig. 9 is a top plan view of the parts shown in Fig. 7.
Figure 10:
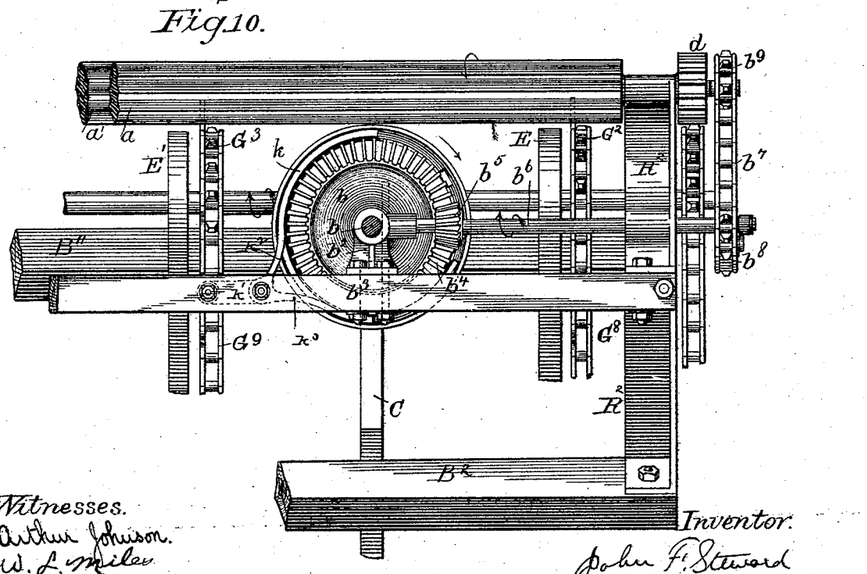
Fig. 10 is a front elevation of the parts shown in Fig. 7.

The stalks are supported and guided to the feeding wheel, after they leave the elevating mechanism by upwardly extending arms $c$, $c'$ and $c^2$, Figs. 8 and 9—which are secured to the upper ends of the lower guide boards C, C' and C$^2$.

$g$ represents a forwardly and downwardly extending chute for directing the stripped ears into the receptacle. It is hinged to the upper edge of the flooring; $a^2$ in order that it may bear the same relative position to the receptacle without regard to the inclination of the frame of the machine. Its upper end extends above the edge of the flooring to prevent any ears from falling back into the machine.

$i$ $i$, &c., represent a series of forwardly and downwardly extending deflecting rods for directing the stalks beyond the forward edge of the machine onto the receptacle, after they have left the stripping rolls. These rods are secured at intervals to a rail $h^2$ attached to the frames R', R$^2$ and extending across the machine substantially on a level with the axis of the forward roll and in front of it.

$h$, $h$, &c., represent a second series of rods, extending in a forward and downward direction, secured to a rail $h'$ overlying the rolls and attached at its ends to the frames R' R$^2$.

These rods serve to deflect the stalks downward on the rods $i$.

The stripping rollers and the feeding wheels are driven by a drive chain $b'$, which extends around the wheels $b^9$, $b^8$ and a wheel $e$, fixed to the end of the shaft G.

The operation of the stripping mechanism is as follows: The ascending stalks are carried onto the arms, $c$, $c'$ and $c^2$ where they are engaged by the teeth of the feeding wheel which presents them to the rollers which as a result of their construction and arrangement, carry the stalks upward between them, but prevent the ears from following. The ears are thus detached and fall upon the chute $g$, which directs them into the receptacle. The stalks are delivered by the rollers upon the rods $i$, $i$, &c., and fall therefrom onto the wagon.

The wagon may be provided with a frame to receive the stalks but permit the passage therethrough of the ears—in the event of which the ears and stalks would be separated.

When the stripping mechanism is applied, it will of course be necessary to remove the deflectors I, and chute J, and apply the arms $c$, $c'$ and $c^2$, the chute $g$ and the sprocket wheel $e$.

It is to be understood that I do not confine myself to the exact details of construction herein shown, as they are susceptible of various forms of embodiment within the limit of the invention.

Having thus described my invention, what I claim is—

1. In a corn harvester, the combination of the wheeled frame, the inclined elevating mechanism extending in a forward and upward direction and acting to convey the cut stalks to the front of the machine, the cutting mechanism located at the rear end of the machine and adapted to sever the standing stalks and the deflecting mechanism located adjacent to the cutter and adapted to act on the severed stalks and direct them to the elevating mechanism substantially as described.

2. In a corn harvester, the combination of the wheeled frame, the inclined elevating mechanism extending forward and upward and acting to elevate the cut stalks to the front of the machine, and the gathering cutting and deflecting mechanisms at the lower end of the machine, the said gathering mechanism constructed to act in a direction opposite to that of the advance of the machine, and to present the standing stalks to the cutter, and the said deflecting mechanism constructed to deflect the cut stalks laterally to the elevating mechanism, substantially as described.

3. The combination with a corn cutting and elevating mechanism of a wheeled receptacle for receiving the cut corn connected therewith and adjustable horizontally with relation thereto: whereby the machine is adapted to operate on rows of corn at varying distances apart.

4. The combination of the wheeled frame, the elevating mechanism thereon, the divider L, the gathering chain acting in conjunction with said divider and substantially parallel therewith, the cutting mechanism adjacent to the gathering mechanism, the fixed deflecting rod, and the deflecting chain acting in conjunction with said rod and extending substantially parallel therewith.

5. In a corn harvesting machine the combination of the wheeled elevator frame, the trough for the cut corn located at the lower end thereof, the gathering chain and the gatherer L, between which the stalks pass preparatory to being severed, the cutter located at the side of the trough, the deflecting chain extending from a point adjacent to the cutter laterally toward the stubble side of the machine and the deflecting rod extending substantially parallel to the deflecting chain.

6. In a corn harvesting machine the combination of the wheeled frame, the receptacle at one end thereof, the gathering mechanism at the side of the frame, the cutter located in rear of the gathering mechanism, the deflecting chain extending from a point in advance of the cutter laterally toward the stubble side of the machine, and the deflecting rod extending across the path of the incoming stalks in advance of the cutter and substantially parallel with the deflecting chain: whereby the incoming stalks encounter the deflecting rod and are engaged by the deflecting chains before being severed by the cutter.

7. In a corn-harvesting machine, the horizontal rock-shaft F, journaled thereto, the upright shaft $L^6$, sustained by said rock-shaft and movable bodily therewith, the forwardly-extending gathering-chain sustained by the upright shaft, suitable connections for driving the upright shaft and for transmitting motion therefrom to the gathering-chain, and mechanism for rocking the shaft F: whereby the forward end of the gathering chain may be raised or lowered, as circumstances may demand, by rocking the shaft F.

8. In a corn harvester, the wheeled frame, the rock shaft F, the shaft bearing M' rigidly secured to one end thereof the upright shaft $L^6$, mounted in said bearing and provided with the gathering device, the segment gear $F^2$ secured to the other end of the rock shaft, the worm $F^3$ arranged to engage the segment gear, and its operating shaft and the crank thereon, in combination with the fixed gatherer L.

9. In a corn harvesting machine the wheeled elevator frame, the rock shaft F, extending transversely across said frame, the shaft bearing M' rigidly secured thereto, the shaft $L^6$ mounted in said bearings, the cutter mounted on the lower end of said shaft, the gathering chain mounted on said shaft above the cutter and extending forward therefrom, and the deflecting chain mounted on the shaft $L^6$ above the gathering chain, and extending laterally therefrom toward the stubble side of the machine in combination with the fixed gatherer L at the side of the gathering chain, and the deflecting rod O⁶ at the side of the deflecting chain; whereby the position of the gathering chain, deflecting chain and cutter may be varied with relation to the fixed gatherer and deflecting rod.

10. In a corn harvesting machine the wheeled frame provided with the series of elevating chains extending lengthwise thereof, the rock shaft F at the lower end of the frame, the sprocket wheels loosely mounted thereon and carrying the elevating chains and the gathering and deflecting mechanism sustained by said shaft in a fixed relation thereto: whereby the said shaft may be rocked to adjust the gathering and deflecting mechanisms, without interfering with the operation of the elevating chains.

11. In a corn harvester, the draft tongue P, the link movable horizontally on a vertical axis and provided in its free end with the vertical opening, in combination with the intermediate connecting section and the vertical pivots 1 and 2 connecting said section with the end of the tongue and link respectively.

12. In a corn harvesting machine, the combination of the wheeled frame, the upper and lower sprocket wheels, the endless elevating chains passing around said wheels, the transverse rock shaft F having the lower wheel mounted loosely thereon, the gathering mechanism and the cutting mechanism, sustained by and movable with the said rock shaft, and means for rocking the shaft.

13. The side frames R' and R² provided with means for attachment to the delivery end of the elevator frame in combination with the stripping rollers journaled in said frames and the elevating device sustained by said frames below the picking rollers and adapted to receive the stalks from the elevator and present them to the stripping rolls.

14. The combination of the side frames R' and R² provided with means for attachment to the delivery end of the elevator frame, the two stripping rollers journaled side by side in the upper part of said frames and provided with driving gears, and the elevating wheel, sustained by the said frames below the picking rollers and provided with suitable driving mechanism.

15. In a corn harvesting and picking machine, the tilting elevator frame, the cutting mechanism at the lower end of said frame and the stripping mechanism at its upper end, and the chute g, for receiving the picked ears jointed to said frame below the stripping mechanism, in combination with the wheeled receptacle beneath said chute—whereby the relative positions of the chute and receptacle may remain fixed as the frame is tilted to vary the cut.

16. The wheeled frame, the cutting mechanism at the lower end, the elevating mechanism thereon, and the stripping mechanism at the delivery end of the elevating mechanism in combination with the feeding wheel located between the elevating mechanism and the picking mechanism and operating to present the ascending stalks to the latter.

17. The wheeled frame, the cutting mechanism at the lower end, the elevating mechanism thereon; and the stripping rollers at the delivery end of the elevating mechanism in combination with the feeding wheel located beneath the stripping rollers and revolving in a vertical plane parallel to the axis of the rolls: whereby the ascending stalks are presented by the feeding wheel sidewise to the picking rollers.

18. In a corn harvesting and stripping machine, the combination of the revolving feeding wheel located at the delivery end of the elevating mechanism beneath the stripping rollers and provided with the teeth adapted to be projected in an operative position on the ascending side of the wheels, and to be retracted on the descending side.

19. In a corn harvesting and stripping machine, the combination of the feeding wheel located at the delivery end of the elevating mechanism beneath the stripping rollers, and provided with the pivoted teeth and the track for causing said teeth to be sustained in an operative position.

20. In a corn harvesting machine the cutter shaft L⁶, the cutter N and the cutter guard N' mounted thereon, one fixed to said shaft—and the other movable with relation thereto in combination with the stop for preventing the rotation of the latter.

21. In a corn harvesting machine, the combination of the wheeled frame, the elevating chains thereon, the rock shaft F, the sprocket wheels mounted loosely thereon and carrying the elevating chains and the gathering mechanism sustained by said shaft F and movable therewith.

22. In a corn harvesting machine, the combination of the wheeled frame the upper and lower sprocket wheels, and the endless chains supported by said wheels, the transverse rock shaft F, having the lower wheels mounted loosely thereon, the endless gathering chain and its driving shaft, said shaft sustained by and movable with the rock shaft.

23. The wheeled frame having the cutting mechanism at the lower end, and the stalk elevating mechanism extending lengthwise of the frame in combination with the stripping mechanism arranged to act on the ears above the delivery end of the elevating mechanism, and the intermediate elevating device located at the delivery end of the elevating mechanism below the picking mechanism and acting continuously in a vertical plane to receive the stalks from the elevating mechanism and present them positively upward to the stripping mechanism.

JOHN F. STEWARD.

Witnesses:
W. L. MILES,
A. L. UPTON.